Patented Mar. 6, 1951

2,544,071

UNITED STATES PATENT OFFICE

2,544,071

DIETHYLENETRIMELAMINE AND METHOD OF PREPARING THE SAME

James R. Dudley, Darien, Conn., assignor to American Cyanamid Company, New York, N. Y., a corporation of Maine No Drawing. Application January 30, 1947, Serial No. 725,253

4 Claims. (Cl. 260—249.6)

This invention relates to a new chemical compound and to method of preparing the same, and more particularly to the production of a new and useful triazine derivative, specifically diethylenetrimelamine.

The triazine derivatives of the general class with which this invention is concerned may be represented by the following general formula

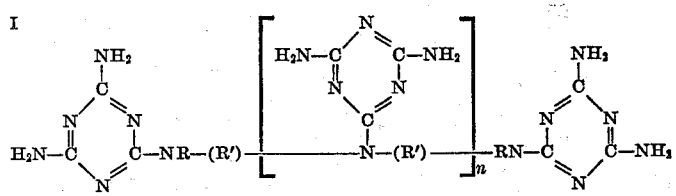

where R represents a member of the class consisting of hydrogen and monovalent hydrocarbon radicals, R' represents a divalent hydrocarbon radical (that is, a divalent radical composed solely of carbon and hydrogen) bonded through carbon to nitrogen and containing not less than two carbon atoms, and $n$ represents one of the following: 0, a small whole number (e. g., 1, 2, 3, 4, 5, etc.). When $n$ is 0 the triazine derivative contains only two s-triazinyl (1,3,5-triazinyl) nuclei.

Illustrative examples of monovalent hydrocarbon radicals which R in the above formula may represent are: aliphatic (e. g., methyl, ethyl, propyl, isopropyl, butyl, isobutyl, sec.-butyl, butenyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, phenylpropyl, etc.). Illustrative examples of divalent hydrocarbon radicals which R' in the above formula may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aromatic, e. g., phenylene, naphthylene, etc.; divalent aliphatic-substituted aromatic, e. g., 2,4-tolylene, ethyl-2,5-phenylene, isopropyl-3,4-phenylene, 1-butyl-2,4-naphthylene, etc.; divalent aromatic-substituted aliphatic, e. g., phenylethylene, phenylpropylene, naphthylisobutylene, xylylene, alpha-(4-tolylene) beta'-butyl, etc.; and radicals that may be classed either as divalent aromatic-substituted aliphatic or divalent aliphatic-substituted aromatic, e. g., 4,alpha-tolylene, 3,beta-phenyleneethyl, 4,alpha-xylylene, 2,gamma-phenylenebutyl, etc. Thus, R' may represent a divalent hydrocarbon radical represented by the formula —Ar—R''—Ar— where Ar represents an arylene radical and R'' represents an alkylene radical.

When $n$ in Formula I represents 0 the chemical compounds of the general class with which this invention is concerned may be represented by the general formula

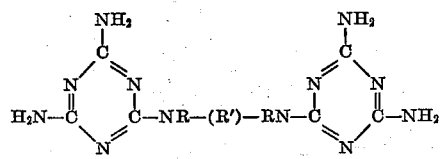

where R and R' have the same meanings as given above with reference to Formula I.

Diethylenetrimelamine and other compounds of the kind embraced by Formulas I and II may be used, for example, as flame-proofing agents, fungicides or insecticides, or as components of such materials, or in the preparation of derivatives thereof, e. g., ureido, methylol, methylene, etc., derivatives of the individual compound embraced by Formula I. These compounds are especially valuable for use in the preparation of synthetic resinous compositions. Thus, they may be condensed with, for instance, aldehydes, including polymeric aldehydes, hydroxyaldehydes and aldehyde-addition products, to yield resinous condensation products having particular utility in the plastics and coating arts. Such reaction products are more fully described and are specifically claimed in my copending application Serial No. 725,254 filed concurrently herewith, now Patent No. 2,524,727, issued October 3, 1950.

More specific examples of chemical compounds embraced by Formulas I and II are the alkylenedimelamines (e. g., ethylene dimelamine, the propylenedimelamines, the butylenedimelamines, the pentylenedimelamines, hexamethylenedimelamine, decamethylenedimelamine, etc.); the arylenedimelamines (e. g., the phenylenedimelamines, the naphthylenedimelamines, the biphenylenedimelamines, etc.); the aryl-substituted alkylenedimelamines (e. g., the phenylethylenedimelamines, the phenylpropylenedimelamines, the naphthylisobutylenedimelamines, the xylylenedimelamines, etc.); the alkyl-substituted arylenedimelamines (e. g., the tolylenedimelamines, the ethylphenylenedimelamines, the isopropylphenylenedimelamines, etc.); the dialkylene and diarylene trimelamines, the trialkylene and triarylene tetramelamines, the tetralkylene and tetrarylene pentamelamines, the pentalkylene and pentarylene hexamelamines, the hexalkylene and hexarylene heptamelamines, etc., and the corresponding aromatic-substituted alkylene and aliphatic-substituted arylene polymelamines, examples of all of which will be apparent from the foregoing examples of the dimelamines and from the second and third paragraphs of this specification.

Various methods may be employed to produce the chemical compounds which are within the scope of Formulas I and II. Compounds represented by the general formula

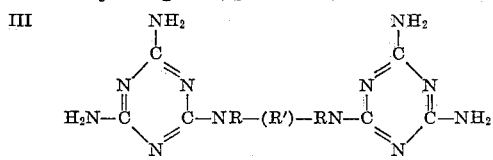

where R represents a member of the class consisting of hydrogen and monovalent hydrocarbon radicals and R' represents a divalent hydrocarbon radical bonded through carbon to nitrogen and containing not less than two carbon atoms, are prepared, for example, by effecting reaction under heat between (1) a triazine derivative represented by the general formula

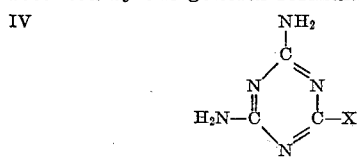

where X represents a halogen of the class consisting of chlorine and bromine, more particularly 2-chloro-4,6-diamino-1,3,5-triazine and 2-bromo-4,6-diamino-1,3,5-triazine, and (2) a diamine represented by the general formula

where R and R' have the meanings above given, the reactants of (1) and (2) being employed in a molar ratio corresponding to approximately two mols of the triazine derivative of (1) per mol of the diamine of (2). Substantially more than two mols of the triazine derivative for each mol of the diamine may be used if desired. Compounds represented by the general formula

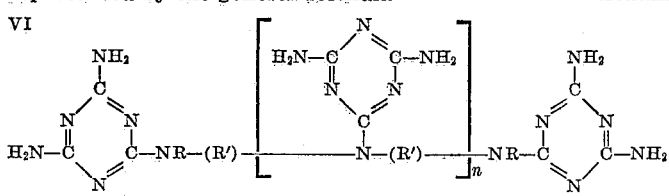

where R and R' have the same meanings as given above with reference to Formula III and n represents a small whole number are prepared, for example, by effecting reaction under heat between (1) a triazine derivative of the kind represented by Formula IV and (2) a polyamine represented by the general formula

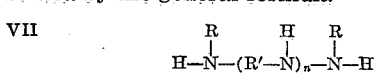

where R, R' and n have the meanings heretofore given, the reactants of (1) and (2) being employed in a molar ratio corresponding to approximately $2+n$ mols of the triazine derivative of (1) per mol of the polyamine of (2). If desired, substantially more than $2+n$ mols of the triazine derivative for each mol of the polyamine may be employed. In each case, that is, in producing the compounds represented by Formulas III and VI, the desired compound is then isolated from the resulting reaction mass.

Illustrative examples of polyamines (diamines, triamines, tetramines, etc.) that may be employed, depending upon the particular end product desired, are listed below:

Ethylenediamine
Diethylene triamine
Triethylenetetramine
Tetraethylenepentamine
1,2-butanediamine
1,4-butanediamine (tetramethylenediamine)
1,5-pentanediamine
o-, m- and p-Phenylenediamines
1,2-propanediamine (1,2-diaminopropane)
1,3-propanediamine (trimethylenediamine)
1,4-naphthalenediamine
1,4-anthradiamine
3,3'-biphenyldiamine
3,4-biphenyldiamine
4,4'-diaminodiphenylmethane
1,2-bis-(cyclohexylamino)-ethane
1,2-bis-(phenylamino)-ethane
1,2-bis-(benzylamino)-ethane
1,2-bis-(methylamino)-ethane
1,2-bis-(tolylamino)-ethane
1,2-bis-(allylamino)-ethane
1,3-bis-(naphthylamino)-propane
1,3-bis-(xylylamino)-propane
1,4-bis-(phenylamino)-butane
1,4-bis-(phenylethylamino)-butane
1,5-bis-(cinnamylamino)-pentane
1,5-bis-(propylphenylamino)-pentane
1,3,5-triaminopentane
1,3,5-tris-(phenylamino)-pentane
1,3,5-tris-(2'butenylamino)-pentane
1,3,5-tris-(decylamino)-pentane
1,3,5,7-tetraminoheptane
1,3,5,7-tetrakis-(tolylamino)-heptane
1,3,5,7,9-pentaminononane
1,3,5,7,9-pentakis-(ethylamino)-nonane
1,4-diamino-2-butene
3,4-diamino-1-butene
3,4-diamino-1-pentene
1,4-diamino-2-pentene
5,6-diamino-1-hexene
Hexamethylenediamine
Octamethylenediamine
Decamethylenediamine
Octadecamethylenediamine The reaction between the chloro or bromo diamino triazine and the polyamine may be carried out in any suitable manner. Heat ordinarily is used at least to initiate the reaction. The reaction preferably is effected in the presence of a suitable solvent or mixture of solvents. Although various solvents and solvent mixtures may be employed, I prefer to use water or a mixture of water and alcohol. The reaction may be carried out under atmospheric, subatmospheric or superatmospheric pressures. The temperature of reaction may be varied as desired or as conditions may require, but ordinarily will be within the range of 60° C. up to the boiling temperature of the mixed reactants or solution or suspension thereof in water or other solvent.

A strongly alkaline substance is preferably added to the reaction mass after part of the polyamine has been caused to react with the chloro or bromine diamino triazine. In some cases, for example, in the preparation of alkylenepolymelamines, the function of the alkaline substances is to convert to the free base the polyamine hydrochloride or hydrobromide formed as a result of partial reaction between the polyamine and the chloro or bromo triazine reactant. In other cases, for instance in the preparation of arylenepolymelamines, the function of the alkaline substance is to convert to the free base the arylenepolymelamine hydrochloride or hydrobromide that is formed by reaction between the polyamine and the chloro or bromo triazine reactant.

Illustrative examples of alkaline substances that may be employed as above described are the alkali-metal hydroxides and carbonates, more particularly the hydroxides and carbonates of sodium, potassium, lithium, caesium and rubidium; hydroxides of the alkaline-earth metals, e. g., barium hydroxide, calcium hydroxide, etc.; and magnesium hydroxide. The carbonates of alkali metals ordinarily are less desirable because of the greater difficulty in handling due to the carbon dioxide evolved.

The reaction by which the compounds embraced by Formulas I and II are prepared is illustrated by the following equation with particular reference to the preparation of compounds of the kind embraced by Formula II under optimum conditions, that is, when a strongly alkaline substance, e. g., an inorganic base, is employed as heretofore described. In this equation the alkaline substance is shown for purpose of illustration as an alkali-metal hydroxide.

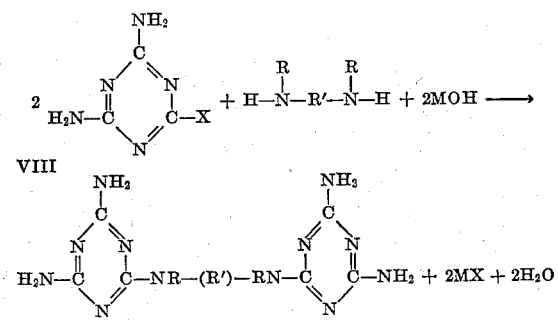

In this equation R, R' and X have the same meanings as hereinbefore given and M represents an alkali metal.

As indicated hereinbefore, after partial reaction between the chloro or bromo diamino triazine and the diamine of Formula V or the polyamine of Formula VII, a strongly alkaline substance such, for instance, as an inorganic base (e. g., sodium hydroxide, potassium hydroxide and the other alkali-metal hydroxides) is preferably added to the reaction mass in an amount which is chemically equivalent to the amount of said triazine derivative employed, and the reaction between the said reactants is then completed in the presence of the said base.

In order that those skilled in the art better may understand how the present invention may be carried into effect, the following examples are given by way of illustration and not by way of limitation. All parts are by weight.

Example 1

In a suitable reaction vessel was placed 4000 parts of water to which was added 1092 parts of aqueous ammonia (approx. 28% NH₃). To the dilute ammonia solution was slowly added 740 parts of cyanuric chloride (approx. 4 mols) with moderate cooling to keep the temperature at 40°–45° C. The resulting slurry of 2-chloro-4,6-diamino-1,3,5-triazine was filtered off, and the filter cake was washed with water until free of ammonium chloride.

The wet cake was slurried with 5000 parts of water and heated to reflux temperature. While heating the slurry, 178 parts of an approximately 67.5% aqueous solution of ethylenediamine (approx. 2.17 mols) was slowly added, keeping the solution neutral to phenol red. Thereafter 1600 parts of a 10% aqueous solution of sodium hydroxide was slowly added. The solution, which cleared after the addition of all of the sodium hydroxide solution, was refluxed for 2 hours and allowed to stand for about 16 hours, yielding a precipitate comprising ethylenedimelamine which was filtered off, washed with water, and dried at 105° C. The yield of the dried product amounted to 535 parts.

The impure material was dissolved in 2920 parts of warm 5% aqueous hydrochloric acid, filtered and reprecipitated by the addition of 1600 parts of 10% aqueous sodium hydroxide solution to the filtrate. The resulting precipitate was filtered off and washed with water until the washings were free of chloride ion. The purified material was dried at 105° C. The dried product, which melted with decomposition at about 305° C., amounted to 498 parts. A sample of this material was further purified by twice reprecipitating the compound from a dilute hydrochloric acid solution thereof by means of a dilute aqueous solution of sodium hydroxide as above described, washed each time until the washings showed the presence of no chloride ion, and then dried at 105° C. After this further purification the ethylenedimelamine, which has the structural formula

IX

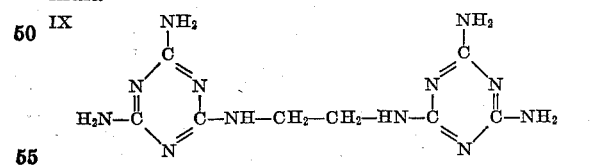

melted at 314°–316° C., and gave the following results upon analysis:

| | Percent N |
|---|---|
| Calculated for C₈H₁₄N₁₂ | 60.41 |
| Found | 58.07 |

Example 2

Wet 2 - chloro - 4,6 - diamino - 1,3,5 - triazine (2 mols) was slurried in 2000 parts of water and a small amount of phenolphthalein was added thereto. The slurry was heated to reflux while stirring and slowly adding an aqueous solution of ethylenediamine (1 mol), keeping the reaction mass just acid to phenolphthalein. The ethylenediamine could be added quite rapidly when the slurry was refluxing. The reaction was slightly exothermic. A 50% aqueous solution of sodium hydroxide (1 mol) was then added slowly, and the mixture was refluxed for 1 hour after all of the caustic solution had been added. A precipitate comprising crude ethylenedimelamine which separated upon cooling the reaction mass was filtered off, washed with water, and then dissolved in a 37% aqueous solution of hydrochloric acid. After filtering this solution, the ethylenedimelamine was reprecipitated by adding a 50% aqueous solution of sodium hydroxide thereto, filtering off the resulting precipitate, washing the separated product with water until the washings were free of chloride ion, and drying the washed ethylenedimelamine at 105° C. This product may be further purified, if desired, by repeated reprecipitations from an aqueous hydrochloric acid solution with a dilute caustic soda solution.

*Example 3*

This example illustrates the preparation of diethylenetrimelamine, which has the structural formula

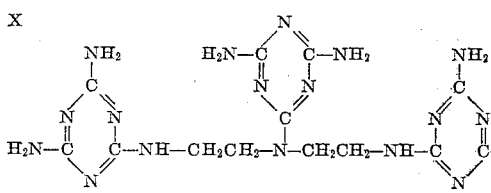

Sixteen hundred and forty parts of an aqueous 28% ammonia solution was added to 6000 parts of water. To this solution was added slowly with stirring 110 parts of cyanuric chloride, and the reaction was allowed to proceed at 45° to 50° C. The resulting slurry was stirred for several hours and then was allowed to stand for about 16 hours. The precipitate comprising 2-chloro-4,6-diamino-1,3,5-triazine was filtered off, and the filter cake was washed with water until free of ammonium chloride.

The wet cake was slurried with 7500 parts of water and thereafter slowly heated to reflux temperature. While heating to reflux, 206 parts of diethylenetriamine was slowly added to the slurry, while keeping the reaction mass acid to phenolphthalein. When all of the triamine had been added, 1600 parts of a 10% aqueous solution of sodium hydroxide was added slowly, yielding a strongly basic solution which was almost clear. Upon cooling the solution, crude diethylenetrimelamine was precipitated. The impure material was filtered off, washed with water, and then was recrystallized from hot water. The yield of the purified product after drying at 105° C. was 96% of the theoretical. The diethylenetrimelamine was further purified by recrystallizing it two more times from hot water, yielding a product melting at 185°–195° C.

*Example 4*

This example illustrates the preparation of 4,4'-ditylenedimelamine, which has the structural formula

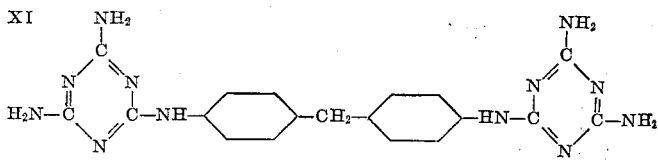

| | Parts | Approx. Molar Ratio |
|---|---|---|
| 2-Chloro-4,6-diamino-1,3,5-triazine | 291.2 | 2 |
| 4,4'-Diaminodiphenylmethane | 198.0 | 1 |

The above ingredients were added to 2000 parts of water and the resulting mixture was heated under reflux at the boiling temperature of the mass for 40 minutes, at the end of which period of time complete solution was obtained. A small amount of decolorizing carbon and 1000 parts of water were added, and heating was continued for 20 minutes. The reaction mass was filtered on a heated funnel. The solid comprising 4,4'-ditylenedimelamine hydrochloride, which separated on cooling, was extremely difficult to filter. The hydrochloride was suspended in 4000 parts of water, and an aqueous solution of sodium hydroxide (2 mols) was added thereto. The resulting mixture was heated under reflux at the boiling temperature of the mass for 30 minutes, cooled and filtered to separate the ditylenedimelamine, which then was washed with water until the washings were neutral to pH paper. The dried, crude 4,4'-ditylenedimelamine, which melted at 322°–326° C. with decomposition, amounted to 313 parts. This yield corresponds to about 75% of the theoretical.

A portion of the crude material was recrystalized twice as the hydrochloride from a dilute aqueous solution of hydrochloric acid and then converted to the free base by adding a dilute aqueous solution of sodium hydroxide. The purified product melted at 322°–326° C. and gave the following results upon analysis:

|  | Percent C (wet method) |
|---|---|
| Calculated for $C_{19}H_{20}N_{12}$ | 54.81 |
| Found | 55.68 |
|  | 55.74 |

*Example 5*

This example illustrates the preparation of 2-N,2'-N'-dicyclohexyl-2-N,2'-N'-ethylenedimelamine, which has the structural formula

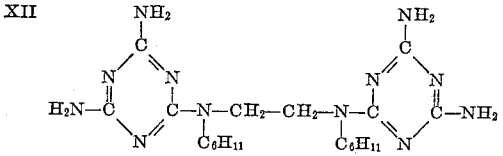

| | Parts | Approx. Molar Ratio |
|---|---|---|
| 2-Chloro-4,6-diamino-1,3,5-triazine | 185.7 | 2 |
| 1,2-Bis-(cyclohexylamino)-ethane | 143.0 | 1 |
| Sodium hydroxide | 57.0 | 2 |

The two first-named ingredients were suspended in 1500 parts of water and heated under reflux at boiling temperature until the reaction mass was neutral to pH paper. The above-stated amount of sodium hydroxide in the form of a dilute aqueous solution was then added slowly to the refluxing mass, keeping the pH below 10 to phenolphthalein indicator. The total time of heating under reflux was 5½ hours. The reaction mass was filtered hot to separate crude 2-N,2'-N'-dicyclohexyl-2-N,2'-N'-ethylenedimelamine, and the filter cake was washed with water until the washings were neutral to pH paper. After drying in an oven at 105° C. for 5 hours, the yield of dried product, M. P. 275° C.

with decomposition, was 256 parts or 90.7% of the theoretical. The dried product was extracted with ethanol to remove any unreacted 1,2-bis-(cyclohexylamino)-ethane.

Forty parts of the dimelamine was dissolved in 400 parts of a dilute aqueous solution of hydrochloric acid, to which was added a small amount of decolorizing carbon. The mixture was refluxed for 1½ hours and filtered hot. The hydrochloride of the dimelamine which separated was converted to the free base by treatment with a dilute sodium hydroxide solution. The product comprising 2-N,2'-N'-dicyclohexyl-2-N,2'-N'-ethylenedimelamine was filtered off, washed with water until the washings were free of chloride ion, and then dried at 105° C. The dried product melted at 325°–328° C., followed by decomposition at 330° C.

A sample of 2-N,2'-N'-dicyclohexyl-2-N,2'-N'-ethylenedimelamine which was further purified by crystallization from an aqueous solution of ethylene glycol monoethyl ether melted at 335°–340° C. and gave the following results upon analysis:

|  | Per cent C |
|---|---|
| Calculated for C₂₀H₃₄N₁₂ | 56.55 |
| Found | 55.35 |
|  | 55.31 |

Example 6

This example illustrates the preparation of decamethylenedimelamine, which has the structural formula

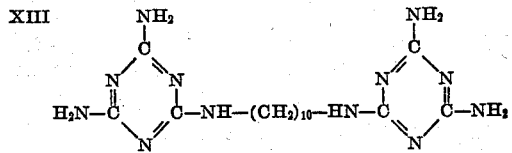

XIII

|  | Parts | Approx. Molar Ratio |
|---|---|---|
| 2-Chloro-4,6-diamino-1,3,5-triazine | 254 | 2 |
| Decamethylenediamine | 147 | 1 |
| Sodium hydroxide | 73 |  |

The chlorodiaminotriazine was suspended in 1750 parts of water, the decamethylenediamine added thereto, and the resulting mixture was heated under reflux at the boiling temperature of the mass for 1¼ hours. The above-stated amount of sodium hydroxide in the form of a 10% aqueous solution was then added slowly to the refluxing mass at such a rate that the pH of the mass did not exceed 10. An oil separated, but on further heating it solidified. One hour after the addition of the sodium hydroxide solution, the reaction mass was cooled and then filtered to separate crude decamethylenedimelamine. The filter cake was washed with water until the washings were neutral to pH paper. After drying in an oven at 105° C., the yield of the crude product was 345 parts (theoretical, 339 parts). This product was soluble in hot butanol, dioxane and ethylene glycol monoethyl ether but did not crystallize from these solvents.

The main portion (300 parts) of the crude decamethylenedimelamine was dissolved in 1500 parts of water containing 154 parts (1.55 mols) of concentrated hydrochloric acid. The decamethylenedimelamine hydrochloride which separated on cooling was filtered off and then suspended in 1500 parts of water. To the cold aqueous suspension was added a 20% aqueous solution of sodium hydroxide until the mass was alkaline to phenolphthalein, after which it was heated to reflux and an additional amount of alkali added thereto. The total amount of 20% aqueous NaOH solution added was 200 parts by volume. The decamethylenedimelamine which separated was filtered off, and the isolated material was washed with water until the washings were neutral to pH paper. The washed material was dried at 105° C., yielding a product which had a melting point of 168°–178° C.

A sample of decamethylenedimelamine which had been recrystallized as the hydrochloride from a dilute aqueous solution of hydrochloric acid and then converted to the free base with a dilute aqueous solution of sodium hydroxide was recrystallized from aqueous ethyl alcohol. The dried, purified material melted at 183°–195° C. and gave the following results upon analysis:

|  | % C | % N |
|---|---|---|
| Calculated for C₁₆H₃₀N₁₂ | 49.23 | 43.09 |
| Found | 50.09 | 41.97 |
|  | 50.35 | 41.98 |

Example 7

This example illustrates the preparation of 2-N,2'-N'-diphenyl-2-N,2'-N'-ethylenedimelamine, which has the structural formula

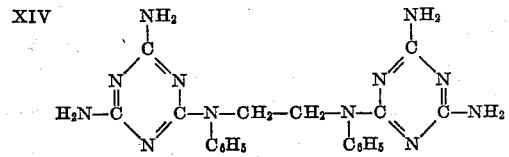

XIV

|  | Parts | Approx. Molar Ratio |
|---|---|---|
| 2-Chloro-4,6-diamino-1,3,5-triazine | 145.6 | 2 |
| 1,2-Bis-(phenylamino)-ethane | 106.0 | 1 |

The above ingredients were suspended in 1300 parts of water, and the mixture was heated under reflux at the boiling temperature of the mass for several hours. The resulting solution was filtered hot. The hydrochloride of 2-N,2'-N'-diphenyl-2-N,2'-N'-ethylenedimelamine which separated upon cooling the filtrate was filtered off. The filtrate was made alkaline with a dilute solution of sodium hydroxide, and the solid 2-N,2'-N'-diphenyl-2-N,2'-N'-ethylenedimelamine that separated was removed by filtration. One hundred and forty parts of the hydrochloride and 115 parts of the free base were obtained. The free base was converted to the hydrochloride and the two portions of hydrochloride were dissolved in hot water, a small amount of decolorizing carbon added, and then filtered. The filtrate was concentrated to increase the yield of the hydrochloride. The hydrochloride was converted to the free base as described in previous examples. The yield of dried, purified 2-N,2'-N'-diphenyl-2-N,2'-N'-ethylenedimelamine, M. P. 350°–355° C., was 209 parts or 77.5% of the theoretical.

A sample of the dimelamine which which had been crystallized three times as the hydrochloride from a dilute aqueous solution of HCl and then converted to the free base by treatment with a dilute aqueous solution of NaOH melted at 350°–354° C. and gave the following results upon analysis:

|  | Per cent C |
|---|---|
| Calculated for C₂₀H₂₂N₁₂ | 55.80 |
| Found | 55.31 |
|  | 55.33 |

Examples of other compounds embraced by Formula I that may be produced as hereinbefore generally described are listed below:

Triethylenetetramelamine
Tetraethylenepentamelamine
Pentaethylenehexamelamine
Hexaethyleneheptamelamine
1,3-cyclohexylenedimelamine
1,2-butylenedimelamine
1,4-butylenedimelamine (tetramethylenedimelamine)
1,5-pentylenedimelamine
o-, m- and p-Phenylenedimelamines
1,2-propylenedimelamine
1,3-propylenedimelamine
1,4-naphthylenedimelamine
1,4-anthrylenedimelamine
3,3'-biphenylenedimelamine
3,4-biphenylenedimelamine
Hexamethylenedimelamine
Octamethylenedimelamine
Octadecamethylenedimelamine
2 - N,2' - N - dibutyl - 2 - N,2' - N' - phenylenedimelamine
2 - N,2' - N' - dibenzyl - 2 - N,2' - N' - ethylenedimelamine
2 - N,2' - N' - dimethyl - 2 - N,2' - N' - ethylenedimelamine
2-N,2'-N'-ditolyl-2-N,2'-N'-ethylenedimelamine
2-N,2'-N'-diallyl-2-N,2'-N'-ethylenedimelamine
2 - N,2' - N' - diisopropyl - 2 - N,2' - N' - trimethylenedimelamine
2 - N,2' - N' - dinaphthyl - 2 - N,2' - N' - trimethylenedimelamine
2 - N,2' - N' - dicyclopentenyl - 2 - N,2' - N' - trimethylenedimelamine
2 - N,2' - N' - dixylyl - 2 - N,2' - N' - tetramethylenedimelamine
2 - N,2' - N' - diphenyl - 2 - N,2' - N' - tetramethylenedimelamine
2 - N,2' - N' - diphenylethyl - 2 - N,2' - N' - tetramethylenedimelamine
2 - N,2' - N' - dicinnamyl - 2 - N,2' - N' - tetramethylenedimelamine
2 - N,2' - N' - diethyl - 2 - N,2' - N' - pentamethylenedimelamine
2 - N,2' - N' - dipropylphenyl - 2 - N,2' - N' - pentamethylenedimelamine
Butenylenedimelamines
Pentenylenedimelamines
Dibutenylenetrimelamines
2 - N,2' - N',2'' - N'' - triallyl - 2 - N,2' - N',2'' - N''-diethylenetrimelamine
2 - N,2' - N',2'' - N'' - tripropyl - 2 - N,2' - N', 2''-N''-diethylenetrimelamine
1,2,3 - tris - (2',4' - diamino - 1',3',5' - triazinylamino)-propane
1,2,3 - tris - (N - 2',4' - diamino - 1',3',5' - triazinyl-N-phenylamino)-propane
1,2,3 - tris - (N - 2',4' - diamino - 1',3',5' - triazinyl-N-pentylamino)-propane
1,3,5 - tris - (2',4' - diamino - 1',3',5' - triazinylamino)-pentane
1,3,5,7 - tetrakis - (2',4' - diamino - 1',3',5' - triazinylamino)-heptane
1,3,5,7 - tetrakis - (N - 2',4' - diamino - 1',3',5' - triazinyl-N-tolylamino)-heptane
1,3,5,7 - tetrakis - (N - 2',4' - diamino - 1',3',5' - triazinyl-N-benzylamino)-heptane
1,3,5,7,9 - pentakis - (2',4' - diamino - 1',3',5' - triazinylamino)-nonane
1,3,5,7,9 - pentakis - (N - 2',4' - diamino - 1',3',5'-triazinyl-N-cyclohexylamino)-nonane
1,3,5,7,9 - pentakis - (N - 2',4' - diamino - 1',3',5'-triazinyl-N-decylamino)-nonane Other examples will be apparent to those skilled in the art from the examples of polyamines aforementioned and from the second and third paragraphs of this specification.

I claim:
1. Diethylenetrimelamine, the formula for which is

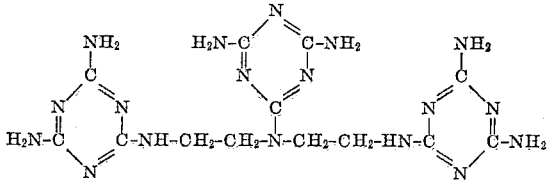

2. The method of preparing diethylenetrimelamine which comprises effecting reaction under heat between 2-chloro-4,6-diamino-1,3,5-triazine and diethylenetriamine in the ratio of approximately three mols of the former per mol of the latter, and isolating diethylenetrimelamine from the resulting reaction mass.

3. A method as in claim 2 wherein, after partial reaction between the 2-chloro-4,6-diamino-1,3,5-triazine and the diethylenetriamine, an inorganic base in an amount which is chemically equivalent to the amount of said chlorodiaminotriazine employed is added to the reaction mass, and the reaction between the said reactants is completed in the presence of the said base.

4. The method of preparing diethylenetrimelamine which comprises forming an aqueous slurry of wet, water-washed 2-chloro-4,6-diamino-1,3,5-triazine resulting from reaction in water between 110 parts of cyanuric chloride and 1640 parts of aqueous 28% ammonia solution; heating the said aqueous slurry to reflux and during said heating slowly adding thereto 206 parts of diethylenetriamine while keeping the reaction mass acid to phenolphthalein indicator; adding slowly to the reaction mass, after all of the diethylenetriamine has been added, 1600 parts of a 10% aqueous solution of sodium hydroxide thereby to obtain a strongly basic solution; cooling the said basic solution whereupon diethylenetrimelamine precipitates; and separating the said diethylenetrimelamine from the said solution.

JAMES R. DUDLEY.

REFERENCES CITED

The following references are of record in the file of this patent:

UNITED STATES PATENTS

| Number | Name | Date |
|---|---|---|
| 2,223,930 | Griessback | Dec. 3, 1940 |
| 2,294,873 | D'Alelio | Sept. 1, 1942 |
| 2,295,574 | Freidheim | Sept. 15, 1942 |
| 2,306,439 | Hentrich | Dec. 29, 1942 |
| 2,338,493 | D'Alelio | Jan. 4, 1944 |
| 2,368,451 | D'Alelio | Jan. 30, 1945 |
| 2,392,607 | Nagy | Jan. 8, 1946 |

FOREIGN PATENTS

| Number | Country | Date |
|---|---|---|
| 106,397 | Switzerland | 1924 |
| 106,401 | Switzerland | 1924 |
| 183,196 | Switzerland | 1936 |

OTHER REFERENCES

Widmer: British Plastics, pp. 508–513, Feb. 1943.

Certificate of Correction

Patent No. 2,544,071

March 6, 1951

JAMES R. DUDLEY

It is hereby certified that error appears in the printed specification of the above numbered patent requiring correction as follows:

Column 1, line 47, for "isopentrylene" read *isopentylene*; column 3, line 63, for the right-hand portion of the formula reading "NR—" read *RN—*; column 4, line 45, for "(2'butenylamino)" read *(2'-butenylamino)*; column 5, line 14, for "substances" read *substance*; column 7, line 25, for "CH$_2$CH$_2$—NH—" read *CH$_2$CH$_2$—HN—*; column 9, line 13, for "2—N,2'—N—" read *2—N,2'—N'—*; column 10, line 66, strike out the word "which", second occurrence;

and that the said Letters Patent should be read as corrected above, so that the same may conform to the record of the case in the Patent Office.

Signed and sealed this 19th day of June, A. D. 1951.

[SEAL]

THOMAS F. MURPHY,
*Assistant Commissioner of Patents.*